United States Patent
Jari et al.

(10) Patent No.: US 6,907,532 B2
(45) Date of Patent: Jun. 14, 2005

(54) COMMUNICATION NODE, COMMUNICATION NETWORK AND METHOD OF RECOVERING FROM A TEMPORARY FAILURE OF A NODE

(75) Inventors: Arkko Jari, Karppalantie (FI); Ahonen Pasi, Salotie (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 828 days.

(21) Appl. No.: 09/796,894

(22) Filed: Mar. 2, 2001

(65) Prior Publication Data

US 2001/0020275 A1 Sep. 6, 2001

(30) Foreign Application Priority Data

Mar. 4, 2000 (GB) .............................................. 0005143

(51) Int. Cl.[7] ...................... G06F 11/30; G06F 12/14; H04L 9/00; H04L 9/32
(52) U.S. Cl. ...................... 713/201; 713/153; 713/171; 707/9; 709/223; 709/225
(58) Field of Search ................................. 713/201, 153, 713/171, 200, 193, 151, 157, 168; 707/9, 202, 204, 203; 709/223, 225; 705/80

(56) References Cited

U.S. PATENT DOCUMENTS

| | | | | |
|---|---|---|---|---|
| 5,608,720 A | * | 3/1997 | Biegel et al. ................ 370/249 |
| 5,721,779 A | | 2/1998 | Funk ........................... 713/155 |
| 5,778,395 A | * | 7/1998 | Whiting et al. .............. 707/204 |
| 5,949,876 A | | 9/1999 | Ginter et al. .................. 705/80 |
| 5,983,350 A | * | 11/1999 | Minear et al. .............. 713/201 |
| 6,327,660 B1 | * | 12/2001 | Patel ........................... 713/193 |
| 6,385,727 B1 | * | 5/2002 | Cassagnol et al. .......... 713/193 |
| 6,629,248 B1 | * | 9/2003 | Stachura et al. ............ 713/340 |
| 6,701,437 B1 | * | 3/2004 | Hoke et al. .................. 713/201 |
| 2003/0237003 A1 | * | 12/2003 | Rautiainen et al. ......... 713/201 |

FOREIGN PATENT DOCUMENTS

| | | |
|---|---|---|
| GB | 2319710 | 5/1998 |
| WO | WO98/27502 | 6/1998 |

* cited by examiner

*Primary Examiner*—Kim Vu
*Assistant Examiner*—Beemnet W Dada

(57) ABSTRACT

An IPsec-capable node 2, such as a security gateway 2, is provided for a virtual private network 1. The security gateway 2 contains a CPU 4 having a volatile memory 5 in which is stored, among other things, a security association database for controlling secure communications between the network and external users. A controller 6 periodically stores the security association database in a disk memory 7 or other nonvolatile memory. When a restoration of power to the security gateway is detected following a power failure, the controller 6 retrieves the latest security association database from the memory 7 and injects it into the volatile memory 5 whose contents were lost during the power failure. The security gateway 2 may then restore secure communication with external users.

18 Claims, 4 Drawing Sheets

COMMUNICATION NODE, COMMUNICATION NETWORK AND METHOD OF RECOVERING FROM A TEMPORARY FAILURE OF A NODE

This application claims priority under 35 U.S.C. §§119 and/or 365 to 0005143.3 filed in the United Kingdom on Mar. 4, 2000; the entire content of which is hereby incorporated by reference.

FIELD OF THE INVENTION

The present invention relates to node for a communication network, such as a security gateway for a virtual private network, and to a communication network including such a node. The present invention also relates to a method of recovering from a temporary failure of a node.

BACKGROUND TO THE INVENTION

There is an ever increasing demand for mobility in communications systems. However, this demand must be met in a manner which provides for the secure transfer of data between communicating parties. A concept known as Virtual Private Network (VPN) has recently been introduced with the aim of satisfying, by a combination of encryption and secure access, this demand. A VPN may involve one or more corporate Local Area Networks (LANs) or Intranets, as well as users coupled to "foreign" LANs, the Internet, wireless mobile networks, etc. An Internet Engineering Task Force (IETF) standard known as IPsec has been defined and provides for the creation of a secure connection between parties in a VPN over IPv6. In the IPsec model, the end points of the secure connection are identified by their IP addresses. Although this may be satisfactory for users having a fixed connection, it does present problems for the mobile user (such as a user who connects to the VPN via a wireless terminal) who wishes to roam between different access networks. The main problem is that the IP address allocated to the roaming mobile user is likely to change dynamically as the user moves between access networks. In the event of an IP address change, it is difficult to reuse the pre-existing security associations (of IPsec) and, in the worst case scenario, the communicating parties need to make a re-authentication of one another and establish new security associations on the basis of the new IP address(es). VPNs provide security gateways or firewalls which control access to a VPN from users outside the VPN. Whilst a mobile user is located within the VPN, the preparations for future lightweight and secure remote access are made. A Security Association (as disclosed in RFC 2408, Internet Security Association and Key Management Protocol (ISAKMP), November 1998) is negotiated between the mobile user and the security gateway. The ISAKMP security association provides protection for messaging in accordance with RFC 2409, The Internet Key Exchange (IKE), November 1998. One or more pairs of security associations are established for the purpose of protecting actual user data traffic. Further security associations may be necessary in order to ensure secure communication with the mobile user when outside the VPN.

Security associations generally have a limited lifetime so as to prevent unauthorised access by deciphering each security association. When a security association reaches the end of its defined lifetime, it is replaced by another previously negotiated security association between the mobile user and the security gateway.

The security gateway comprises a central processing unit (CPU) which contains a Security Association Database (SAD) comprising all of the currently non-expired security associations relevant for communication with the VPN. Access to the VPN is controlled on the basis of the security associations in the SAD. In the event of a power failure or other failure within the security gateway, all security associations can be lost. For example, there may be of the order of 300 such security associations and these will need to be renegotiated when the security gateway is operational again so as to re-establish secure communication. The Internet Engineering task Force (IETF) provides some specifications for restoring operation following such a failure and loss of the SAD but these techniques require a substantial amount of time before secure communication can be restored.

SUMMARY OF THE INVENTION

According to a first aspect of the invention, there is provided a node for a communication network, comprising: a volatile memory for containing a security association database comprising a plurality of security associations; a non-volatile memory; and a controller for periodically storing the security association database in the non-volatile memory and for retrieving the most recently stored security association database from the non-volatile memory in response to a return to a normal operation of the node.

The node may comprise an IPsec-capable node.

The node may comprise a security gateway.

The controller may comprise a secure processor.

The non-volatile memory may comprise a magnetic disk memory. As a possible alternative, the non-volatile memory may comprise a volatile memory and an uninterruptable power supply.

The controller may be arranged to encrypt the security association database for storing in the non-volatile memory and to decrypt the security association database upon retrieval from the non-volatile memory.

The controller may be arranged to retrieve from the non-volatile memory only non-expired security associations.

The controller may be arranged to store the security association database in the nonvolatile memory in response to a change in the security association database.

The controller may be arranged to retrieve the most recently stored security association database in response to a return to the normal operation following a restoration of power to the node.

The controller may be arranged, after storing the security association database, to erase from the non-volatile memory the earliest stored security association database.

Each security association may include a header containing a sequence number and the controller may be arranged, when retrieving the security association database, to increment the sequence number by an amount substantially equal to the product of the time since the security association was stored and a constant. The constant may be substantially equal to the maximum bit rate of a communication link divided by a smallest packet size in bits.

According to a second aspect of the invention, there is provided a communication network including a node according to the first aspect of the invention.

According to a third aspect of the invention, there is provided a method of recovering from a temporary failure of a communication node which stores in a volatile memory a security association database comprising a plurality of security associations, the method comprising periodically storing the security association database in a non-volatile memory and retrieving the most recently stored security association database from the non-volatile memory when the node returns to normal operation after the temporary failure.

The node may comprise an IPsec-capable node.

The node may comprise a security gateway.

The temporary failure may comprise a power supply failure.

The security association database may be encrypted before being stored in the nonvolatile memory and may be decrypted after being retrieved from the non-volatile memory.

Only non-expired security associations may be retrieved from the non-volatile memory.

The security association database may be stored in the non-volatile memory in response to a change in the security association database.

The earliest stored security association database may be erased after storing the current security association database.

Each security association may include a header containing a sequence number and, when the security association database is retrieved, each sequence number may be incremented by an amount substantially equal to a product of the time since the security association was stored and a constant. The constant may be substantially equal to the maximum bit rate of a communication link divided by a smallest packet size in bits.

It is thus possible to provide an arrangement which substantially reduces the time required to restore fill operation of a security gateway and, in particular, to restore secure communication, for example with mobile users. Because all non-expired security associations can be retrieved with a relatively small delay, little or no renegotiations of security associations is necessary. In a typical example, recovery of as many as 300 security associations may be achieved in less than ten seconds. This is substantially faster than the IETF techniques and thus reduces or minimises the time during which secure communication has to be suspended.

DETAILED DESCRIPTION OF A PREFERRED EMBODIMENT

Figure 1:
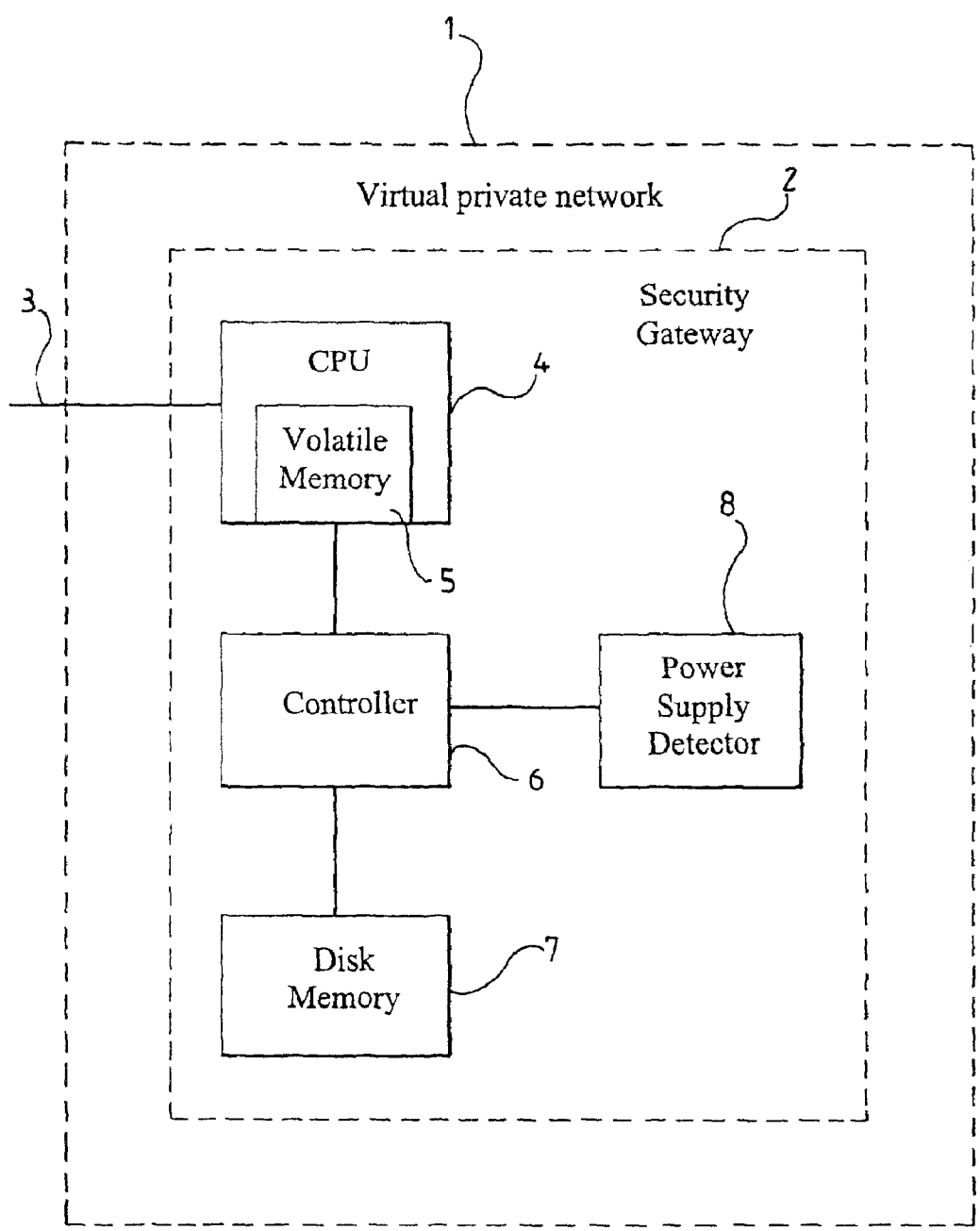
FIG. 1 is a block schematic diagram illustrating a virtual private network and a security gateway constituting embodiments of the invention.

FIG. 1 illustrates a virtual private network (VPN) 1 which includes a security gateway 2 for controlling external access to the VPN through a communication channel illustrated diagrammatically at 3. For example, the channel 3 may be connected to a public network including one or more wireless terminals for providing mobile communication with mobile users.

The security gateway 2 comprises a central processing unit (CPU) 4 in the form of one or more programmable data processors controlled by a stored program. The CPU 4 includes a volatile memory 5, for example in the form of random access memory (RAM), for storing temporary values generated during operation of the CPU 4 in accordance with normal programmed data processor or computer techniques. During normal operation of the security gateway 2, the volatile memory contains, among other things, a security association database (SAD) in the form of a plurality of security associations. For example, each security association may comprise a header sequence number, encryption and authentication algorithms and parameters, and lifetime information for the security association. The security gateway 2 controls communication between external or mobile users and the VPN 1 in accordance with the pre-negotiated security associations in a manner which is known and which will therefore not be described further.

The security gateway 2 comprises a controller 6 for controlling read and write operations between the CPU 4 and a disk memory 7. The controller 6 is preferably in the form of a secure processor which cannot be removed from its circuit board without being damaged and which cannot be used or read by an attacker. Thus, even if an attacker gains illegal access to the security gateway and particularly to the controller 6, this will not assist in "hacking" into the system. The disk memory 7 may, alternatively, be replaced by any non-volatile read/write memory, such as a random access memory arrangement provided with an uninterruptable power supply.

The controller 6 is connected to a power supply detector 8 which detects whether power is supplied to the security gateway 2. In particular, the detector 8 detects the restoration of power following a failure of the power supply to the security gateway 2. The controller 6 may alternatively or additionally be connected to other detectors for detecting when operation of the security gateway and, in particular, CPU 4 is restored following other types of (temporary) failure. As another alternative, the CPU 4 may be arranged to request retrieval automatically upon return to normal operation (including recovery from a power failure, in which case the detector 8 may be unnecessary).

Figure 2:
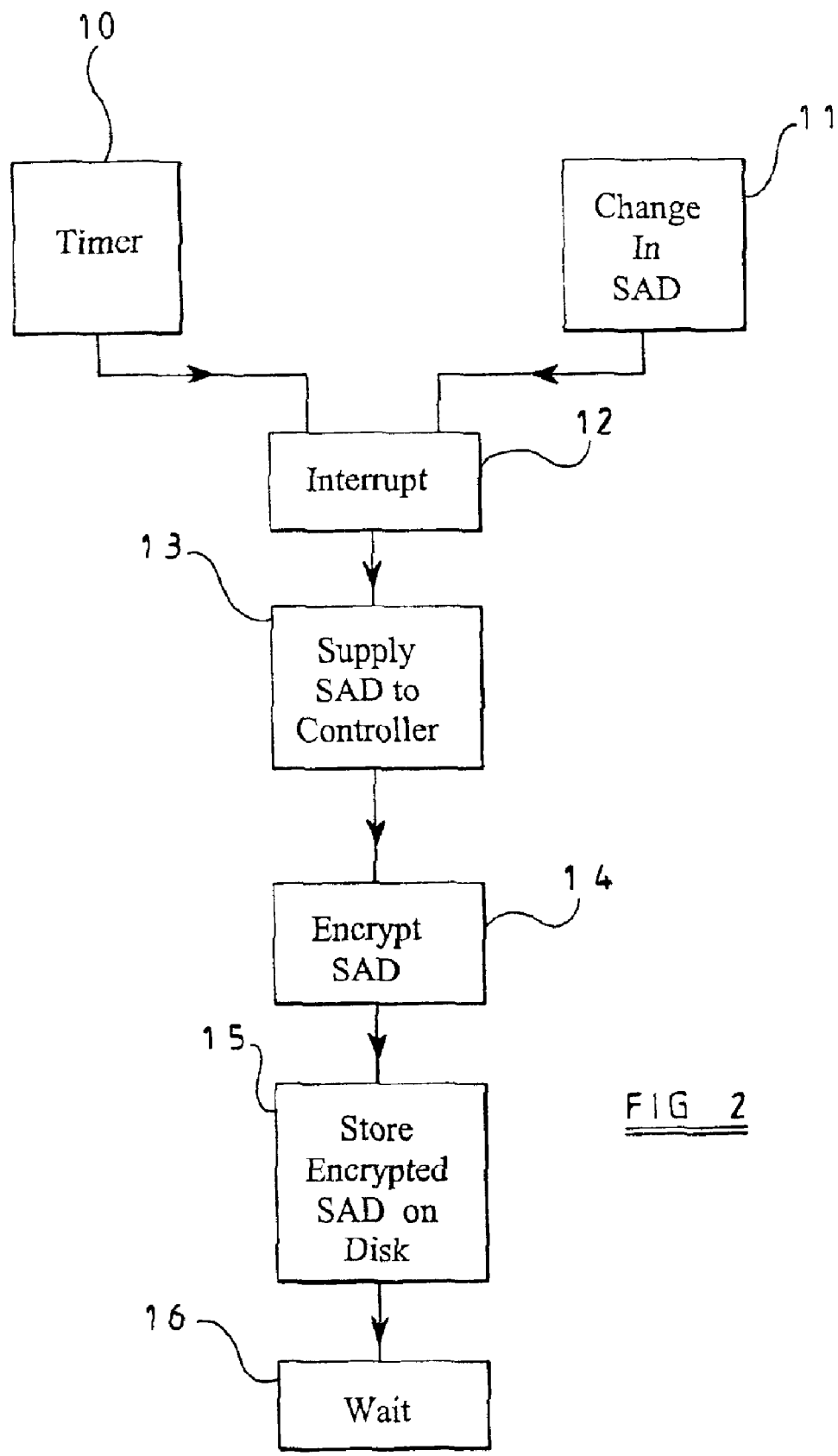
FIG. 2 is a flow diagram illustrating storing of a security association database storing in the security gateway of FIG. 1.

During normal operation of the security gateway 2, the current security association database in the volatile memory 5 is periodically stored in the disk memory 7 by the controller 6. This is illustrated in FIG. 2. A timer 10 periodically supplies a pulse to initiate SAD storage. For example, the timer 10 may actuate a storage cycle three times in each fifteen minute interval. Alternatively or additionally, a change in the SAD as shown at 11 may initiate a storage cycle.

In response to receipt of a signal for initiating a storage cycle, an interrupt is generated at 12, for example for a data processor within the controller 6. The controller 6 accesses the volatile memory 5, either directly or via the data processors of the CPU 4, which supply the current SAD at 13 to the controller 6. The controller 6 encrypts the SAD at 14 with a previously generated public key and stores the encrypted SAD in the disk memory 7 at 15. The controller 6 then enters a wait mode at 16 until a further interrupt is received.

In the event of a power failure (or possibly certain other failures) of the security gateway 2, the contents of the volatile memory 5 are erased or corrupted so that the current SAD is lost. When power is restored and the security gateway 2 is operative again, the power supply detector 8 supplies a signal illustrated at 20 in FIG. 3 to generate another interrupt 21 for the data processor of the controller 6. At 22, the controller 6 retrieves the most recently stored SAD from the disk memory 7 and, at 23, decrypts the SAD using the latest private key which, for example, may be stored in the disk memory 7 in association with the SAD. The controller 6 may delete expired security associations from the SAD as illustrated at 24 before writing the SAD to the volatile memory 5 as shown at 25. Alternatively, the controller 6 may simply "inject" the whole SAD into the volatile memory of the CPU 4, which then deletes expired security associations. The SAD is thus restored with very little delay and allows the security gateway 2 to begin controlling secure communication between external users and the VPN 1 very quickly. The controller 6 then enters the wait mode as illustrated at 26 and awaits the next interrupt.

Each security association contains a header which includes a sequence number representing the order of data packets of a message. A remote user checks that the received packets relating to a security association arrive in approximately the correct order. In particular, although adjacent packets may not arrive in the correct sequence order but can be restored to the correct sequence order by the remote user, any packets whose sequence numbers are more than a predetermined amount earlier than the most recently received packet sequence number are treated as suspicious by the remote user. This allows precautions to be taken against a so-called "replay attack", where an attacker records part of a previously sent message and sends this again. When the remote user detects the arrival of packets whose sequence numbers are much earlier than the most recently received packets, the appropriate action can be taken to prevent the attack, for example by discontinuing the connection.

Figure 3:
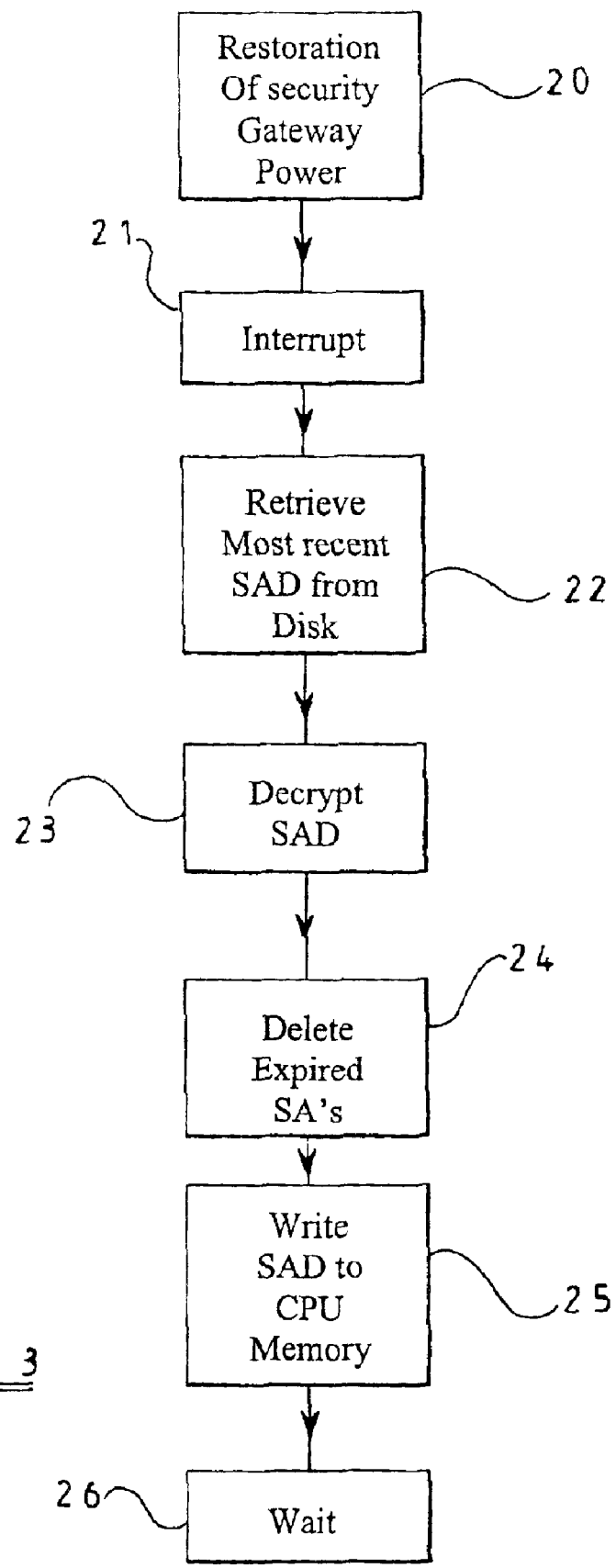
FIG. 3 is a flow diagram illustrating retrieval of a security association database in the security gateway of FIG. 1.

In order to avoid the detection of a replay attack by remote user as a result of a power failure in the security gateway, controller 6 is arranged to update the sequence numbers of the security associations retrieved from the memory 7, for example between the steps 23 and 25 illustrated in FIG. 3. In particular, as each security association is retrieved from the memory 7, the controller 6 allocates the security association a new sequence number by increasing the last-stored sequence number by a sufficiently large increment. For example, the new sequence number for the retrieved security association may be calculated as the sequence number when the security association was stored plus the product of the elapsed time in seconds after the last storage and a constant. In order to ensure that the increment is sufficiently large, the constant has a value which is related to the bandwidth of the communication link and the smallest packet size which may be transmitted so that the remote user receives a sequence number which is guaranteed to be higher than any previously received sequence number. In particular, the constant may be made equal to the maximum bit rate of the communication link divided by the smallest packet size in bits. This ensures that the remote user identifies a genuine connection and does not incorrectly detect a possible replay attack.

Figure 4:
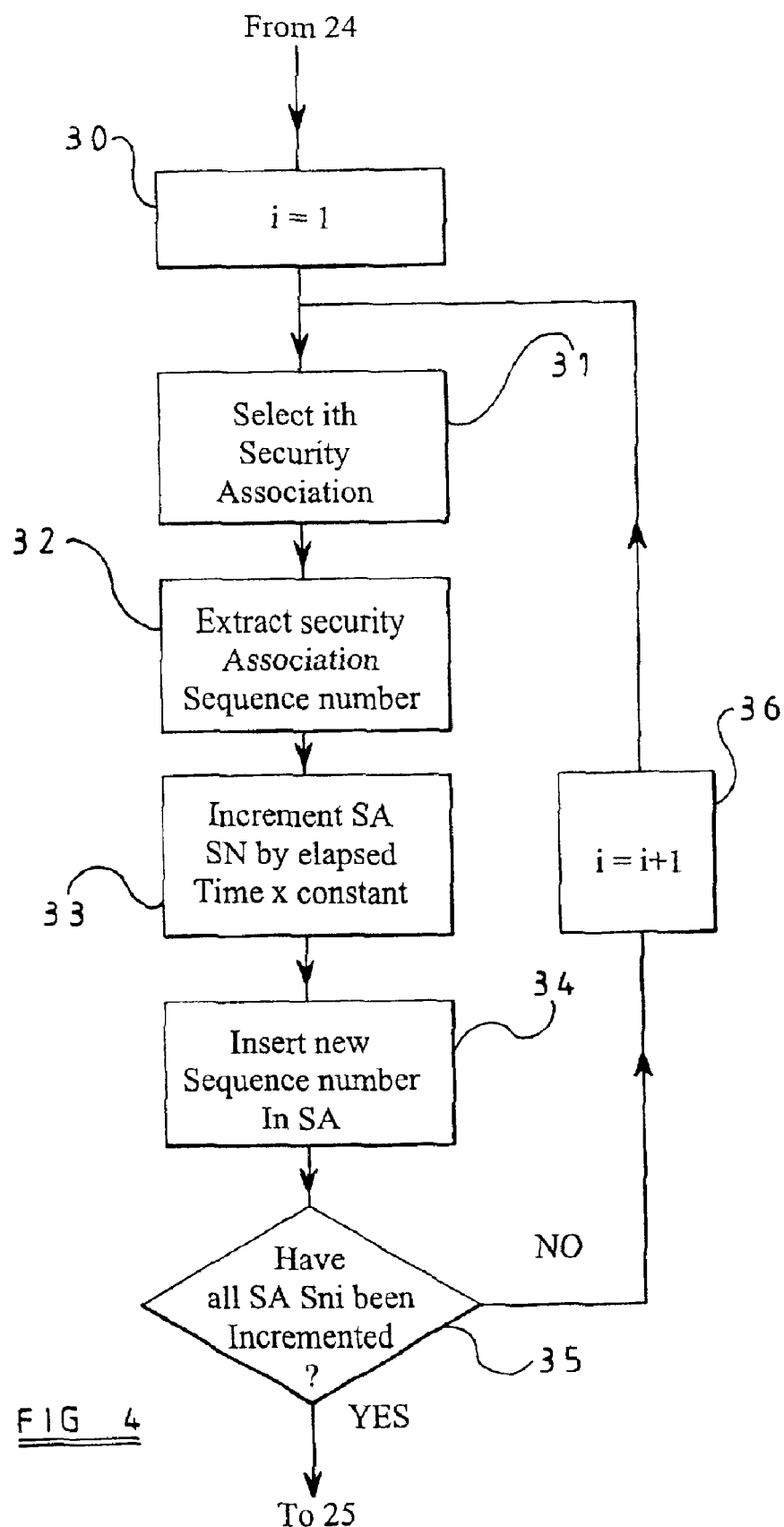
FIG. 4 is a flow diagram illustrating incrementing of security association sequence numbers.

A routine for incrementing the sequence numbers is illustrated in FIG. 4 and is inserted between the steps 24 and 25 of FIG. 3. In a step 30, a variable i is set equal to 1. A step 31 selects the ith security association and a step 32 extracts the sequence number of the security association. A step 33 increments the sequence number of the security association by the product of the elapsed time in seconds since the security association was stored and a constant equal to the maximum bit rate of the communication link divided by the smallest packet size in bits. A step 34 then inserts the new sequence number in the security association.

A step 35 determines whether all security association sequence numbers have been incremented. If not, a step 36 increments the variable i by one and returns to the step 31. When all of the security associations sequence numbers have been incremented, the step 25 is performed.

What is claimed is:

1. A system for recovering from a temporary failure of a communication node, comprising:

a volatile memory for containing a security association database comprising a plurality of security associations, wherein each security association includes a header containing a sequence number;

a non-volatile memory; and a controller comprising:

means for periodically storing the security association database in the non-volatile memory;

means responsive to a loss of the security association database in the volatile memory, for retrieving the most recently stored security association database from the non-volatile memory when the node returns to normal operation;

means for determining whether any of the security associations in the retrieved database have expired;

means responsive to a determination that a given security association has expired, for deleting the expired security association from the retrieved database; and means responsive to a determination that a given security association has not expired, for incrementing the sequence number of the given security association by an amount substantially equal to the product of the time since the given security association was stored and a constant.

2. The system as claimed in claim 1, comprising an IPsec-capable node.

3. The system as claimed in claim 1, comprising a security gateway.

4. The system as claimed in claim 1, in which the controller comprises a secure processor.

5. The system as claimed in claim 1, in which the non-volatile memory comprises a magnetic disk memory.

6. The system as claimed in claim 1, in which the non-volatile memory comprises a volatile memory and an uninterruptable power supply.

7. The system as claimed in claim 1, in which the controller is arranged to encrypt the security association database for storing in the non-volatile memory and to decrypt the security association database upon retrieval from the nonvolatile memory.

8. The system as claimed in claim 1, in which the controller is arranged to store the security association database in the non-volatile memory in response to a change in the security association database.

9. The system as claimed in claim 1, in which the controller is arranged to retrieve the most recently stored security association-database in response to a return to the normal operation following a restoration of power to the node.

10. The Rode system as claimed in claim 1, in which the controller is arranged, after storing the security association database, to erase from the non-volatile memory the earliest stored security association database.

11. The system as claimed in claim 1, in which the constant is substantially equal to the maximum bit rate of a communication link divided by a smallest packet size in bits.

12. A method of recovering from a temporary failure of a communication node having a volatile memory and a non-volatile memory, said method comprising the step of:

storing in the volatile memory, a security association database comprising a plurality of security associations, wherein each security association includes a header containing a sequence number;

periodically storing the security association database in the non-volatile memory;

detecting a return to normal operation of the node following the temporary failure;

in response to detecting the return to normal operation, retrieving the most recently stored security association database from the non-volatile memory;

determining whether any of the security associations in the retrieved database have expired;

in response to determining that a given security association has expired, deleting the expired security association from the retrieved database; and in response to determining that a given security association has not expired, incrementing the sequence number of the given security association by an amount substantially equal to the conduct of the time since the given security association was stored and a constant.

13. The method as claimed in claim 12, wherein the step of detecting a return to normal operation includes detecting a power-on situation following a power supply failure.

14. The method as claimed in 12, wherein the step of storing the security association database in the non-volatile memory includes encrypting the security association database before storing the database in the non-volatile memory, and the step of retrieving the database includes decrypting the database after the database is retrieved from the non-volatile memory.

15. The method as claimed in claim 12, wherein the step of storing the security association database in the non-volatile memory includes storing the database in the non-volatile memory in response to a change in the security association database.

16. The method as claimed in claim 12, further comprising erasing the earliest stored security association database after storing the current security association database.

17. The method as claimed in claim 12, wherein the step of incrementing the sequence number of the given security association includes incrementing the sequence number by an amount substantially equal to the product of the time since the given security association was stored and a constant substantially equal to the maximum bit rate of a communication link divided by a smallest packet size in bits.

18. A virtual private network comprising:

at least one local area network; and a security gateway for controlling access to the local area network from users outside the virtual private network, said security gateway comprising:

a volatile memory for storing a security association database comprising a plurality of security associations, wherein each security association includes a header containing a sequence number;

a non-volatile memory; and a controller comprising:

means for periodically storing the security association database in the non-volatile memory;

means responsive to a loss of the security association database in the volatile memory, for retrieving the most recently stored security association database from the non-volatile memory when the node returns to normal operation;

means for determining whether any of the security associations in the retrieved database have expired;

means responsive to a determination that a given security association has expired, for deleting the expired security association from the retrieved database; and means responsive to a determination that a given security association has not expired, for incrementing the sequence number of the given security association by an amount substantially equal to the product of the time since the given security association was stored end a constant.

* * * * *

UNITED STATES PATENT AND TRADEMARK OFFICE
CERTIFICATE OF CORRECTION

PATENT NO.        : 6,907,532 B2                                             Page 1 of 1
APPLICATION NO.   : 09/796894
DATED             : June 14, 2005
INVENTOR(S)       : Arkko Jari et al.

It is certified that error appears in the above-identified patent and that said Letters Patent is hereby corrected as shown below:

In Column 3, Line 30, delete "fill" and insert -- full --, therefor.

In Column 6, Line 56, in Claim 10, after "The" delete "Rode".

In Column 6, Line 65, in Claim 12, delete "step" and insert -- steps --, therefor.

In Column 7, Line 19, in Claim 12, delete "conduct" and insert -- product --, therefor.

In Column 8, Line 38, in Claim 18, delete "end" and insert -- and --, therefor.

Signed and Sealed this

Twentieth Day of November, 2007

JON W. DUDAS
*Director of the United States Patent and Trademark Office*